US009304833B2

(12) United States Patent
Marappan (10) Patent No.: US 9,304,833 B2
(45) Date of Patent: Apr. 5, 2016

(54) SYSTEM AND METHOD OF PROVIDING INTER-APPLICATION COMMUNICATIONS (71) Applicant: International Business Machines Corporation, Armonk, NY (US)

(72) Inventor: Kumar Marappan, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 228 days.

(21) Appl. No.: 14/063,321

(22) Filed: Oct. 25, 2013

(65) Prior Publication Data
US 2014/0082639 A1 Mar. 20, 2014

Related U.S. Application Data (63) Continuation of application No. 11/278,732, filed on Apr. 5, 2006, now abandoned.

(51) Int. Cl.
*G06F 3/00* (2006.01)
*G06F 9/44* (2006.01)
*G06F 9/46* (2006.01)
*G06F 13/00* (2006.01)
*G06F 9/54* (2006.01)

(52) U.S. Cl.
CPC *G06F 9/54* (2013.01); *G06F 9/542* (2013.01); *G06F 2209/543* (2013.01)

(58) Field of Classification Search
None
See application file for complete search history.

(56) References Cited

U.S. PATENT DOCUMENTS

| 5,404,534 | A | 4/1995 | Foss et al. |
| 6,202,099 | B1 | 3/2001 | Gillies et al. |
| 6,782,403 | B1 | 8/2004 | Kino et al. |
| 6,834,296 | B2 | 12/2004 | Brown et al. |
| 6,938,247 | B2 | 8/2005 | Czajkowski |
| 2002/0144010 | A1 | 10/2002 | Younis et al. |
| 2004/0205458 | A1* | 10/2004 | Hwang ............... G06F 17/2264 715/255 |
| 2005/0044197 | A1 | 2/2005 | Lai |
| 2005/0044554 | A1 | 2/2005 | Hinson et al. |
| 2006/0010392 | A1* | 1/2006 | Noel .................... G06F 3/0481 715/759 |
| 2006/0209868 | A1 | 9/2006 | Callaghan |
| 2007/0282793 | A1* | 12/2007 | Majors ............. G06F 17/30861 |
| 2012/0191784 | A1* | 7/2012 | Lee ................ H04N 21/234327 709/205 |

OTHER PUBLICATIONS

Lawrence G. Palmer and Ricky S. Palmer; Shared Desktop: A Collaborative Tool for Sharing 3-D Applications among Different Window Systems; pp. 42-49; 1997.*
Li B Zhen, Office Action U.S. Appl. No. 11/278,732, Mar. 8, 2010.
(Continued)

*Primary Examiner* — H S Sough
*Assistant Examiner* — Kimberly Jordan
(74) *Attorney, Agent, or Firm* — Ronald Kaschak; Robert C. Rolnik (57) ABSTRACT

A method of operating an operating system for providing inter-application communications between a publisher application and a subscriber application. The method includes receiving a publication request from the publisher application at an operating system, receiving a subscriber application from the subscriber application at the operating system, performing an operating system based event brokering procedure based on the publication request and the subscription request, and publishing an event based on the procedure.

15 Claims, 4 Drawing Sheets

(56) References Cited

OTHER PUBLICATIONS

Robert C. Rolnik, AmendmenttoOfficeAction U.S. Appl. No. 11/278,732, May 10, 2010.
Li B Zhen, Office Action U.S. Appl. No. 11/278,732, Aug. 3, 2010.
Robert C. Rolnik, Request for Continued Examination U.S. Appl. No. 11/278,732, Sep. 29, 2010.
Kimberly L. Jordan, Office Action U.S. Appl. No. 11/278,732, Dec. 20, 2012.
Robert C. Rolnik, Response to Office Action Examination U.S. Appl. No. 11/278,732, Apr. 22, 2013.
Kimberly L. Jordan, Office Action U.S. Appl. No. 11/278,732, Aug. 16, 2013.

* cited by examiner

SYSTEM AND METHOD OF PROVIDING INTER-APPLICATION COMMUNICATIONS

The present invention is a continuation to parent U.S. patent application Ser. No. 11/278,732, filed Mar. 22, 2006, entitled "SYSTEM AND METHOD OF PROVIDING INTER-APPLICATION COMMUNICATIONS", priority to which is claimed. The present invention relates generally to computer systems and in particular to the communications between applications.

BACKGROUND

There are situations when it is desirable to allow communication between two or more applications. Such communication allows the programs to provide a flow of information for achieving numerous tasks and can be implemented in numerous circumstances. However, to provide such operability currently requires the applications to be known to, for example, a programmer in order to provide coding for each application. The programmer can thus facilitate communications functionality to each individual program through the coding. Such a process can be tedious and time consuming as the number of programs to which it is desirable to provide inter-application communications can be large.

Another problem with having to provide code to numerous programs can arise from incompatibility issues. In some situations, it is possible that the provided code to the large number of different applications can result in miscommunication or worse, total incompatibility (possibly resulting in a crash in one or more of the applications). As such, it would be desirable to provide a strategy for ensuring that different applications can reliably communicate with one another.

Therefore, it would be desirable to provide a strategy for providing inter-application communications that would overcome the aforementioned and other disadvantages.

BRIEF SUMMARY

One form of the present invention is a data processing system, computer program product and/or method of operating an operating system for providing inter-application communications between a publisher application and a server application. The method includes receiving a publication request from the publisher application at the operating system, receiving a subscription request from the subscriber application at the operating system, performing an operating system based event brokering procedure based on the publication request and the subscription request, and publishing an event based on the procedure.

A second form of the present invention is an operating system for providing inter-application communications between a publisher application and a subscriber application. The operating system comprises computer readable code for receiving a publication request from the publisher application at the operating system, computer readable code for receiving a subscription request from the subscriber application at the operating system, computer readable code for performing an operating system based event brokering procedure based on the publication request and the subscription request, and computer readable code for publishing an event based on the procedure.

A third form of the present invention is an operating system for providing inter-application communications between a publisher application and a subscriber application. The operating system comprises means for receiving a publication request from the publisher application at the operating system, means for receiving a subscription request from the subscriber application at the operating system, and means for performing an operating system based event brokering procedure based on the publication request and the subscription request, and means for publishing an event based on the procedure.

The foregoing and other features and advantages of the invention will become further apparent from the following detailed description of the presently preferred embodiments, read in conjunction with the accompanying drawings. The detailed description and drawings are merely illustrative of the invention, rather than limiting the scope of the invention being defined by the appended claims and equivalents thereof.

DETAILED DESCRIPTION

Figure 1:
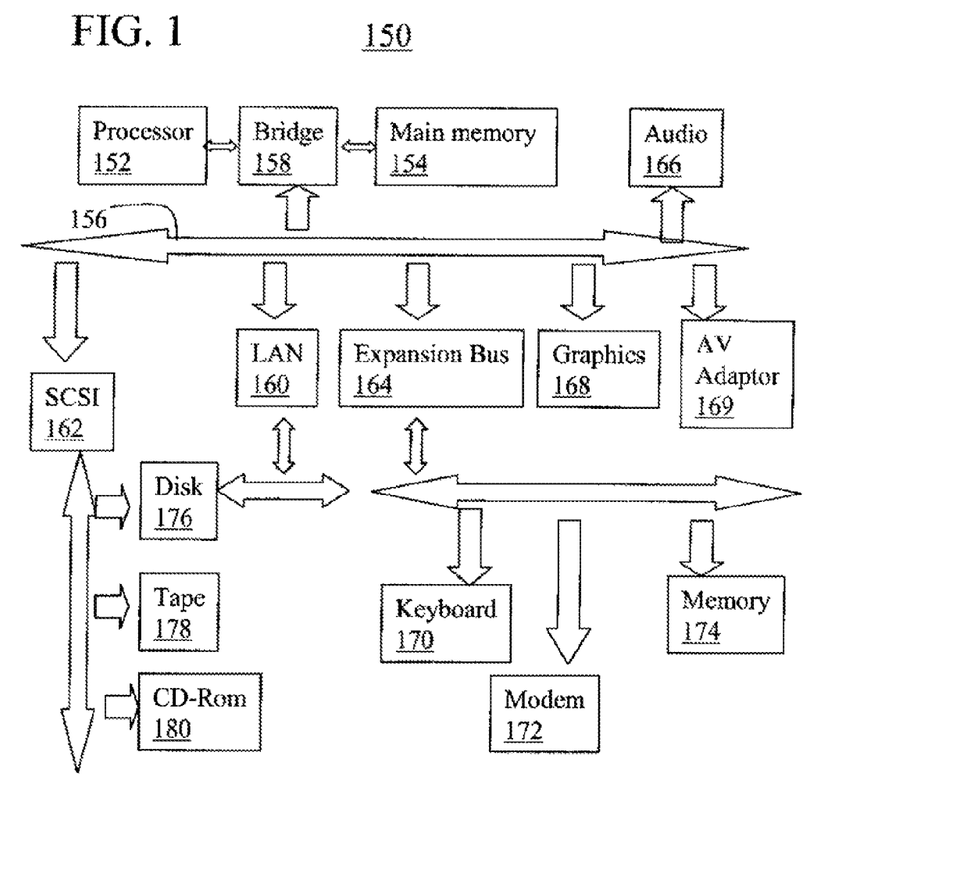
FIG. 1 illustrates a system for controlling copying of documents, in accordance with one embodiment of the present invention.

FIG. 1 illustrates one embodiment of a computer client 150 for use in accordance with one aspect of the invention. Computer system 150 employs a peripheral component interconnect (PCI) local bus architecture. Although the depicted example employs a PCI bus, other bus architectures such as Micro Channel and ISA can be used. PCI bridge 158 connects processor 152 and main memory 154 to PCI local bus 156. PCI bridge 158 also can include an integrated memory controller and cache memory for processor 152. Additional connections to PCI local bus 156 can be made through direct component interconnection or through add-in boards. In the depicted example, local area network (LAN) adapter 160, SCSI host bus adapter 162, and expansion bus interface 164 are connected to PCI local bus 156 by direct component connection. In contrast, audio adapter 166, graphics adapter 168, and audio/video adapter (A/V) 869 are connected to PCI local bus 156 by add-in boards inserted into expansion slots. Expansion bus interface 164 connects a keyboard and mouse adapter 170, modem 172, and additional memory 174 to bus 156. SCSI host bus adapter 162 provides a connection for hard disk drive 176, tape drive 178, and CD-ROM 180 in the depicted example. In one embodiment, the PCI local bus implementation support three or four PCI expansion slots or add-in connectors, although any number of PCI expansion slots or add-in connectors can be used to practice the invention.

An operating system runs on processor 152 to coordinate and provide control of various components within computer system 150. Further, the operating system coordinates inter-application communications as described in further detail below. The operating system can be any appropriate available operating system such as Windows, Macintosh, UNIX, AIX, HP-UX, LINUX, or OS/2, or the like. "Windows" is a trademark of Microsoft Corporation. "Macintosh" is a trademark of Apple Computer, Inc. "UNIX" is a trademark of The Open Group. HP-UX is a trademark of Hewlett-Packard Company. "Linux" is a trademark of the Linux Mark Institute. "A/X" and "OS/2" are trademarks of International Business Machines Corporation. Instructions for the operating system, an object-oriented operating system, and applications or programs are located on storage devices, such as hard disk drive 176 and can be loaded into main memory 154 for execution by processor 152.

Those of ordinary skill in the art will appreciate that the hardware in FIG. 1 may vary depending on the implementation. For example, other peripheral devices, such as optical disk drives and the like may be used in addition to or in place of the hardware depicted in FIG. 1. FIG. 1 does not illustrate any architectural limitations with respect to the present invention, and rather merely discloses an exemplary system that could be used to practice the invention. For example, the processes of the present invention may be applied to two or more client computers connected by a local area network (LAN) or a wide area network (WAN), such as the Internet.

The invention can take the form of an entirely hardware embodiment or an embodiment containing both hardware and software elements. Furthermore, the invention can take the form of a computer program product accessible from a computer-usable or computer-readable storage device providing program code for use by or in connection with one or more computers or any instruction execution system. For the purposes of this description, a computer-usable or computer readable storage device can be any apparatus that can store the program for use by or in connection with the instruction execution system, apparatus, or device. The storage device can be an electronic, magnetic, optical, electromagnetic, or semiconductor system (or apparatus or device). Examples of a computer-readable storage device include a semiconductor or solid-state memory, magnetic tape, a removable computer diskette, a random access memory (RAM), a read-only memory (ROM), a rigid magnetic disk and an optical disk. The term "computer-readable storage device" does not encompass a signal propagation media such as a copper transmission cable, an optical transmission fiber or wireless transmission media.

Figure 2:
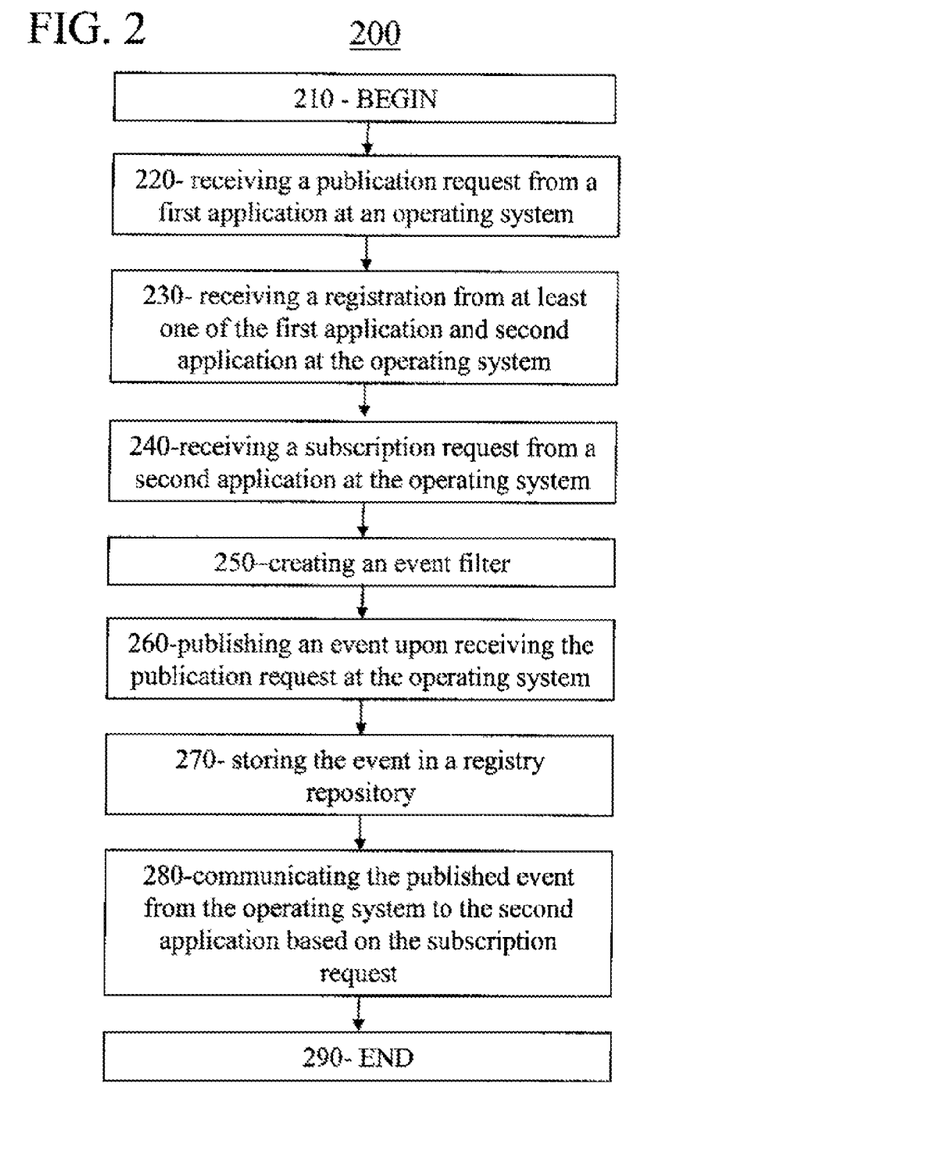
FIG. 2 illustrates a flow chart of providing inter-application communications in accordance with one embodiment of the present invention.

FIG. 2 illustrates one embodiment of a method 200 of providing inter-application communications in accordance with one aspect of the invention. Method 200 begins at step 210. Any of the inventive method steps disclosed herein may be performed in any order, and the order in which the method steps are described does not limit the order in which the steps can be performed. In addition, the method steps and decision therein can be implemented automatically through program coding or through a human user of the computer client.

Figure 3:
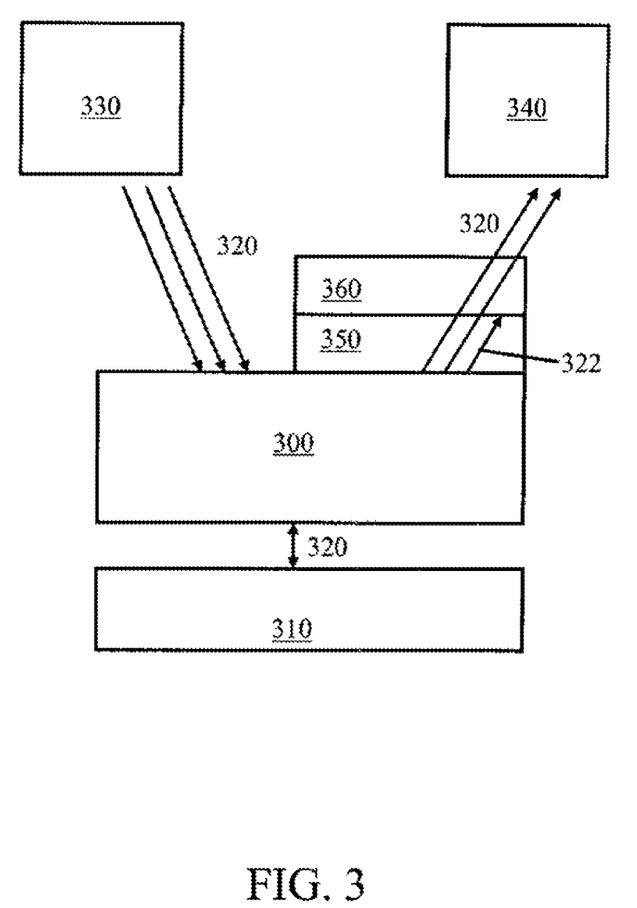
FIG. 3 illustrates communications between two applications through an operating system, in accordance with one embodiment of the present invention.

Method 200 continues at step 220 by receiving a publication request from a publisher application at an operating system (OS). An OS organizes and controls operations of hardware and provides an environment to execute applications on top of and under control of the OS. In one embodiment, the operating system 300 is in communication with a registry repository 310, shown in FIG. 3, for mediating inter-application communications of events 320 between the publisher application 330 and a subscriber application 340. In one embodiment, a filter 350 filters events 320 prior to an interaction between the event listener interface 360 and the events 320. Certain event(s) 322 do not pass through filter 350. An event is defined herein as a representation of an occurrence within an application. An event may be data, such as, for example XML. An event may alternatively be, or include, an executable portion, for example a compiled program or executable code.

Figure 4:
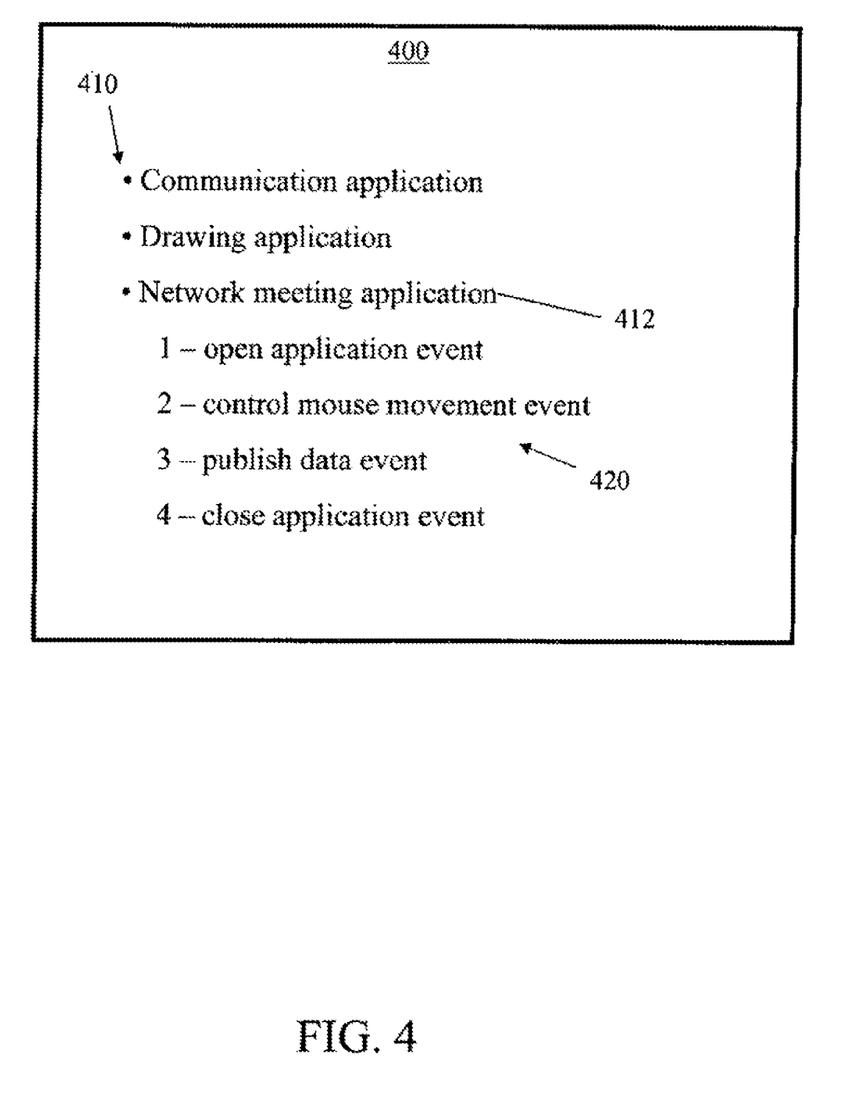
FIG. 4 illustrates a registry of an operating system, in accordance with one embodiment of the present invention.

As shown in FIG. 4, a registry 400 contains metadata describing events produced by various applications that file a publication request with the operating system. Metadata stored in the registry 400 is structured as a collection of application names 410. An application identifier, such as an individual application name 412, is associated with a schema of event types 420 that it may publish, or is subscribed to. An exemplary schema is illustrated in FIG. 4 and includes four event types 420. In one embodiment, event 420 may include properties for describing the event 420 to a subscribed application. The properties may include information for controlling events on an application subscribed to that particular event, for example mouse position or movement data associated with the control mouse movement event. Event 420 can be, for example, formatted as an XML message.

At step 230, the publisher application is registered with the operating system. In one embodiment, the registration takes place during an installation process. Alternatively, the publisher application registers during an independent registration process. For example, if the publisher application is already installed, the publisher application can register at any point by running the independent registration process. At either of these points, a process is run to register the application, and the events it may publish, with the registry of the operating system. In one embodiment, this registration process may be run independently of installation. For example, another application or a system user can request that the publisher application register if it is not already done so. Post-installation registration or update of registration can be applied in instances of a software update, user request, or other process.

At step 240, a subscription request is received from a subscriber application at the operating system. In one embodiment, the subscription request is recorded at the registry. A subscription request may include an application identifier, such as an application name. The application identifier may indicate which application from which the subscriber application wishes to receive events. When a subscription request is received at the operating system, the application identifier may be compared to a collection of application identifiers that are currently registered as publisher applications.

At step 250, an event filter is created. The subscription request may also include a list of event types or other subscription criteria. Subscription criteria may be used to filter what events are passed to the subscriber application. In one embodiment, the subscriber application creates an event filter with the operating system during the filing of a subscription request. An event filter may specify the number and type of published events that are communicated from the registry to the subscriber application. For example, the event filter may only allow published events of an event type specified in subscription criteria to pass through to the subscriber application. The subscription request may include an object that implements an event listener interface with the operating system. The event listener interface of the operating system waits for detection of published events that pass through the filter. If the event matches the subscription request, and passes one or more event filters if they exist, the listener interface communicates the event to the subscriber application. If the event does not match the subscription request, or does not pass at least one of the event filters, the listener interface does not communicate the event to the subscriber application.

The event filter and an event listener interface facilitate an operating system based event brokering by the operations system that encompasses steps 260, 270 and 280.

At step 260, an event is published upon receiving the publication request at the operating system. A published event is an event that has occurred in an application and has been received by the operating system for brokering. In one embodiment, a published event awaits communication to the subscriber application.

In one embodiment, the publisher application publishes and stores events in the registry repository at step 270. Information may be alternatively stored in a standard file or database. The registry repository is a system-defined database used by the operating system to store configuration information. Applications may register, write data and publish events, all of which may be stored and retrieved through the registry repository. The data and format of the registration and published events in the registry and registry repository can vary according to the version and brand of the operating system, or according to the implementation of the operating system event brokering. The operating system may provide publication of the events stored in the registry repository for times the subscriber application is unavailable (e.g., not running) For example, if the subscriber application is closed when an event is published, the published events may be communicated to the subscriber application when it becomes active, as the events have been stored in the registry repository. Alternatively, published events may be discarded if the subscriber application is not available to provide real-time publication and subsequent communication of the event.

Those skilled in the art will recognize that the publisher and subscriber applications can vary in number. For example, a single publisher application can communicate with a plurality of subscriber applications. Likewise, a single subscriber application can communicate with a plurality of publisher applications. The invention is not limited to a single publisher application and a single subscriber application. For example, a plurality of computers running the subscriber application can subscribe for another computer running the publisher application through a connection. As such, published publisher application events are broadcast to numerous computers running the subscriber application through the Internet. As another example, a single subscriber application subscribes to events published by numerous publisher applications running on the same computer. As such, the subscriber application utilizes the information of the events of the numerous publisher applications for various purposes.

At step 280, the published event is communicated from the operating system to the subscriber application based on the subscription request. In one embodiment, the published event is communicated from the operating system registry repository to a subscriber application running on the same client computer as the publisher application. In another embodiment, the published event is communicated from the registry repository to one or more instances of the subscriber application running on separate client computer(s) and linked through a LAN or WAN, such as the Internet. Communication involves sending the published event from the registry repository of the OS of the publisher application to the subscriber application via a network connection. The published event may cause the subscriber application to perform some action. In one embodiment, the event may include a compiled program or application code, either of which may cause the subscriber application to perform some action. For example, a published event can control certain characteristics of the subscriber applications (e.g., mouse movements and/or clicks, open and closing the subscriber application, publication/display of data in real-time, and the like).

As the events are published through the operating system, programming code for providing direct inter-application communication capabilities is not required for each individual application. In addition, the use of an operating system as an event broker can reduce incompatibility issues as the strategy for communicating between applications is standardized. Besides providing an event filter and event listener, the operating system can provide event logging, guaranteed event delivery, event correlation, protocol translation, and other functions.

Those skilled in the art will appreciate that the publisher and subscriber applications can exchange published events through the operating system in a bilateral manner. For example, the subscriber program optionally includes capabilities of the publisher program whereby the program publishes events to the registry repository. The publisher program, which optionally includes capabilities of the subscriber program, subscribes to the events. The publisher and subscriber programs can exchange information in a synchronous or asynchronous manner on the same computer or over different client computers over a LAN or WAN. In this manner, applications may be run over multiple computers in a distributed manner via a publish/subscribe mechanism over the Internet.

In one embodiment, information can be shared during a network meeting, which illustrates various steps implemented by the present invention. A publisher application, running on a host computer, publishes screen shot images as well as various actions being performed on the application. These events may be published over a network (e.g., Internet) to numerous participants (e.g., client computers) in the meeting. The participants each run the subscriber application, which receives published events (i.e., as screen shot images and the actions) from the OS of the publisher computer based on subscription requests from the subscriber application at step 240. The participants can see not only the screen shot images being communicated across the network, but also the actions being performed on the publisher application as step 280. Processing may terminate thereafter at step 290.

In the present example, the published events (e.g., which are subscribed to during step 250) are communicated from the publisher application to the subscriber application via the OS of the host computer, which were stored in the registry repository during step 240. The published events (which are published during step 270) include the screen shot images as well as the actual actions being performed on the publisher application. As such, the network meeting allows communication between the publisher application and OS run on the host computer and the subscriber application run on the client computer(s).

In one embodiment, the publisher/subscriber model may be applied to hand writing recognition. For example, some hand writing recognition software applications have two modes, one for recognizing alphabetical characters and the other for recognizing numeric characters. The handwriting and numeric applications can subscribe to another application for providing, for instance, contacts, calendars, appointments, and the like. When a user tabs to a numeric field in an appointment application (e.g., the publisher application) the tab information can be communicated as published events to the handwriting recognition application (e.g., the subscriber application). The handwriting recognition application can then automatically switch its mode to the numeric recognition application. As such, communication is provided between a publisher application, OS, and subscriber application running on the same computer.

While the embodiments of the present invention disclosed herein are presently considered to be preferred embodiments, various changes and modifications can be made without departing from the spirit and scope of the present invention. The scope of the invention is indicated in the appended claims, and all changes that come within the meaning and range of equivalents are intended to be embraced therein.

What is claimed is:

1. A method of sharing information entered by a publisher to a participant in a shared network meeting, the method comprising the steps of:
receiving a subscription request from a subscriber application of the participant that specifies a publisher application of the publisher and subsequently, the subscriber application becoming inactive;
receiving a published event from the publisher, the published event representing an action performed by the publisher on a user interface on the publisher application, the published event comprising program code to perform the action on the user interface, and in response, to the published event,
one or more processors determining that the published event matches the subscription request from the subscriber application which the subscriber application is inactive, and subsequently, the one or more processors determining that the subscriber application becomes active, and only in response, sending a screen shot of the user interface from an operating system of the publisher application to the subscriber application, without the action being represented in the screen shot which is sent, and
sending the action, including the program code, separate from the screen shot, from the operating system of the publisher application to the subscriber application; and
the subscriber application receiving and displaying the screen shot, receiving the program code and subsequently executing the program code to perform the action and displaying a result of the execution of the program code on the screen shot such that the participant sees the action performed on the user interface after seeing the user interface before the action was performed.

2. The method of claim 1, wherein the step of displaying a result comprises displaying mouse movements with respect to the screen shot.

3. The method of claim 1, further comprising the steps of:
receiving a second published event from the publisher, the second published event representing closing the application on the publisher application, the second published event comprising program code to perform the closing on the user interface, and in response to the second published event,
the one or more processors determining that the second published event matches the subscription request from the subscriber application,
sending the closing, including the program code, from the operating system of the publisher application to the subscriber application; and
the subscriber application receiving the closing, and removing the screen shot such that the participant sees the closing performed on the user interface, after seeing the action performed.

4. The method of claim 1, wherein each of the first subscriber application and the second subscriber application are on computers distinct from each other.

5. The method of claim 1, further comprising the step of:
subsequent to receiving the subscription request from a subscriber application of the participant that specifies a publisher application of the publisher, setting up an event filter to specify the events subscribed-to as limited to an event type, wherein the event type is not a mouse movement.

6. A computer program product for sharing information entered by a publisher to a participant in a shared network meeting, the computer program product comprising:
one or more computer-readable storage devices and program instructions, stored on at least one of the one or more storage devices, the program instructions comprising:
program instructions to receive a subscription request from a subscriber application of the participant that specifies a publisher application of the publisher, and subsequently, the subscriber application becoming inactive;
program instructions to receive a published event from the publisher, the published event representing an action performed by the publisher on a user interface on the publisher application, the published event comprising program code to perform the action on the user interface, and in response, to the published event,
program instructions to determine that the published event matches the subscription request from the subscriber application which the subscriber application is inactive, and subsequently, determine that the subscriber application becomes active, and only is response, send a screen shot of the user interface from an operating system of the publisher application to the subscriber application, without the action being represented in the screen shot which is sent, and
program instructions to send the action, including the program code, separate from the screen shot, from the operating system of the publisher application to the subscriber application; and
program instructions for the subscriber application to receive and display the screen shot, and further to receive the program code and subsequently execute the program code to perform the action and
program instructions to initiate display of a result of the execution of the program code on the screen shot such that the participant sees the action performed on the user interface after seeing the user interface before the action was performed.

7. The computer program product of claim 6, wherein the program instructions to display a result comprises program instructions to display mouse movements with respect to the screen shot.

8. The computer program product of claim 7, further comprising:
program instructions to receive a second published event from the publisher, the second published event representing closing the application on the publisher application, the second published event comprising program code to perform the closing on the user interface, and in response to the second published event,
program instructions to determine that the second published event matches the subscription request from the subscriber application,
program instructions to send the closing, including the program code, from the operating system of the publisher application to the subscriber application; and
program instructions for the subscriber application to receive the closing, and remove the screen shot such that the participant sees the closing performed on the user interface, after seeing the action performed.

9. The computer program product of claim 6, wherein each of the first subscriber application and the second subscriber application are on computers distinct from each other.

10. The computer program product of claim 6, further comprising:
program instructions to set up an event filter to specify the events subscribed-to as limited to an event type, wherein the event type is not a mouse movement, subsequent to receiving the subscription request from a subscriber application of the participant that specifies a publisher application of the publisher.

11. A computer system for sharing information entered by a publisher to a participant in a shared network meeting, the computer system comprising:
one or more processors, one or more computer-readable memories, one or more computer-readable storage devices and program instructions, stored on the one or more storage devices for execution by the one or more processors via the one or more memories, the program instructions comprising:
program instructions to receive a subscription request from a subscriber application of the participant that specifies a publisher application of the publisher and subsequently, the subscriber application becoming inactive;
program instructions to receive a published event from the publisher, the published event representing an action performed by the publisher on a user interface on the publisher application, the published event comprising program code to perform the action on the user interface, and in response, to the published event,
program instructions to determine that the published event matches the subscription request from the subscriber application while the subscriber application is inactive, and
program instructions to send a screen shot of the user interface from an operating system of the publisher application to the subscriber application, without the action being represented in the screen shot which is sent, and subsequently, determine that the subscriber application becomes active, and only in response send the action, including the program code, separate from the screen shot, from the operating system of the publisher application to the subscriber application; and
program instructions for the subscriber application to receive and display the screen shot and further to receive the program code and subsequently execute the program code to perform the action and
program instructions to display a result of the execution of the program code on the screen shot such that the participant sees the action performed on the user interface after seeing the user interface before the action was performed.

12. The computer system of claim 11, wherein the program instructions to display a result comprises program instructions to display mouse movements with respect to the screen shot.

13. The computer system of claim 11, further comprising:
program instructions to receive a second published event from the publisher, the second published event representing closing the application on the publisher application, the second published event comprising program code to perform the closing on the user interface, and in response to the second published event,
program instructions to determine that the second published event matches the subscription request from the subscriber application,
program instructions to send the closing, including the program code, from the operating system of the publisher application to the subscriber application; and
program instructions for the subscriber application to receive the closing, and remove the screen shot such that the participant sees the closing performed on the user interface, after seeing the action performed.

14. The computer system of claim 11, wherein each of the first subscriber application and the second subscriber application are on computers distinct from each other.

15. The computer system of claim 11, further comprising:
program instructions to set up an event filter to specify the events subscribed-to as limited to an event type, wherein the event type is not a mouse movement, subsequent to receiving the subscription request from a subscriber application of the participant that specifies a publisher application of the publisher.

* * * * *